United States Patent
Liu et al.

(10) Patent No.: US 8,798,477 B2
(45) Date of Patent: Aug. 5, 2014

(54) CHROMATIC DISPERSION MONITOR AND METHOD, CHROMATIC DISPERSION COMPENSATOR

(75) Inventors: Ling Liu, Beijing (CN); Zhenning Tao, Beijing (CN); Takahito Tanimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 763 days.

(21) Appl. No.: 12/623,009

(22) Filed: Nov. 20, 2009

(65) Prior Publication Data

US 2010/0142946 A1   Jun. 10, 2010

(30) Foreign Application Priority Data

Nov. 28, 2008   (CN) .......................... 2008 1 0179426

(51) Int. Cl.
*H04B 10/12*   (2006.01)
*H04B 10/00*   (2013.01)

(52) U.S. Cl.
USPC ........... 398/159; 398/147; 398/150; 398/158; 398/160; 398/161

(58) Field of Classification Search
CPC ............... H04B 10/2507; H04B 10/25073; H04B 10/2513
See application file for complete search history.

(56) References Cited

U.S. PATENT DOCUMENTS

| 6,229,631 | B1 * | 5/2001 | Sato et al. ...................... 398/30 |
| 2004/0151509 | A1 * | 8/2004 | Bulow ........................... 398/147 |

FOREIGN PATENT DOCUMENTS

| JP | 2008-205654 | | 9/2008 | |
| WO | WO 92/22960 | * | 12/1992 | ............. H03L 7/085 |

OTHER PUBLICATIONS

Chinese Office Action dated Mar. 21, 2012 issued in corresponding Chinese Patent Application No. 200810179426.2.
Japanese Office Action mailed Jul. 16, 2013 in corresponding Japanese Application No. 2009-271929.

* cited by examiner

*Primary Examiner* — Darren E Wolf
(74) *Attorney, Agent, or Firm* — Staas & Halsey LLP (57) ABSTRACT

The present invention relates to chromatic dispersion monitor and method, chromatic dispersion compensator. The chromatic dispersion monitor is used for estimating a chromatic dispersion in accordance with a chromatic dispersion correlation amount sequence, comprising: a phase differential unit, for obtaining a phase difference sequence by performing a phase differential calculation in accordance with the chromatic dispersion correlation amount sequence; a phase difference differential unit, for obtaining a phase difference differential sequence by performing a phase difference differential operation; and a chromatic dispersion estimating unit, for estimating the chromatic dispersion in accordance with the phase difference differential sequence obtained by the phase difference differential unit.

9 Claims, 5 Drawing Sheets

CHROMATIC DISPERSION MONITOR AND METHOD, CHROMATIC DISPERSION COMPENSATOR

CROSS-REFERENCE TO RELATED APPLICATIONS

This application claims the benefit of Chinese Application No. 200810179426.2, filed Nov. 28, 2008 in the Chinese Patent Office, the disclosure of which is incorporated herein by reference.

FIELD OF THE INVENTION

The present application relates to communication, and the present application relates to chromatic dispersion estimation and compensation in optical communication system.

BACKGROUND OF THE INVENTION

Figure 1:
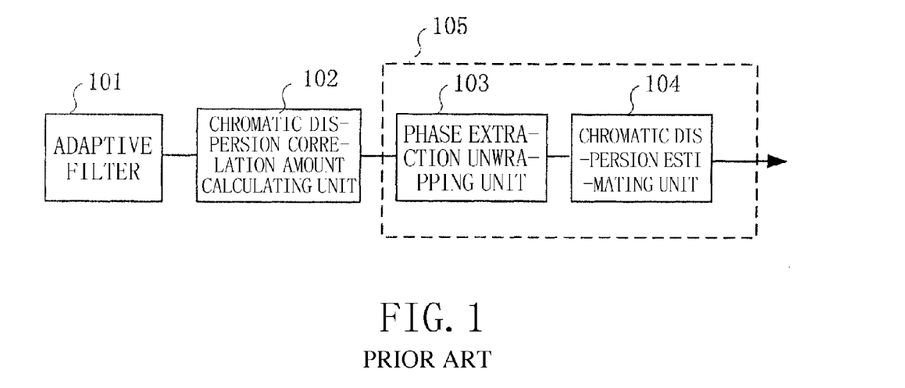
FIG. 1 illustrates a chromatic dispersion monitor of the prior art.

Chromatic dispersion effect in optical fiber will extend width of the transmission pulse, and then cause bit error. In order to eliminate this influence, a chromatic dispersion compensation module shall be added. With respect to a system having time varying chromatic dispersion, real-time monitoring and compensation for the chromatic dispersion are required. The literature OFC2008 OThW2 "Optical Performance Monitoring from FIR Filter Coefficients in Coherent Receivers" provides a real-time chromatic dispersion monitoring method based on filter coefficient analysis. FIG. 1 illustrates a chromatic dispersion monitor for the real-time chromatic dispersion monitoring method. As shown in FIG. 1, the chromatic dispersion monitoring device of the prior art comprises an adaptive filter 101, a chromatic dispersion correlation amount calculating unit 102 and a chromatic dispersion monitor 105, wherein the chromatic dispersion monitor 105 comprises a phase extraction unwrapping unit 103 and a chromatic dispersion estimating unit 104.

The adaptive filter 101 can be a single FIR adaptive filter (single-polarization system), or a set of adaptive filters having butterfly structure (double-polarization system). The chromatic dispersion correlation amount calculating unit 102 extracts chromatic dispersion correlation component $H(\omega)$ with certain algorithm based on the filter coefficient. $H(\omega)$ is a set of discrete sequences represented as $h_1, h_2, \ldots, h_N$ with the length equal to the filter coefficient length N. In the sequence $h_1, h_2, \ldots, h_N$, respective element has the form of $Ae^{j(\omega^2 a + \omega b + c)} + n$, wherein $\alpha$ is in a one-to-one correspondence to the chromatic dispersion amount in the system, A, b and c are constants unrelated to the chromatic dispersion, and n is a noise item. The phase extraction unwrapping unit 103 extracts a phase of $H(\omega)$; as the extracted phase is always within $[0, 2\pi)$, and the actual value of quadratic curve may exceed the range, the phase extraction unwrapping unit 103 is required for unwrapping at the same time. The chromatic dispersion estimating unit 104 obtains the above parameter $\alpha$ through quadratic fitting, and hence estimates the chromatic dispersion. This method balances the system with the adaptive filter, extracts chromatic dispersion correlated portion based on the converged filter coefficient, and estimates the parameter $\alpha$ through quadratic fitting of phase angle, so as to obtain the chromatic dispersion amount in the system. This estimation method has the problem of phase wrap, i.e., once the phase wrap is wrong, the chromatic dispersion amount will not be estimated correctly.

BRIEF SUMMARY OF THE INVENTION

In view of the current state of the prior art, the invention is provided to overcome one or more defects of the prior art, and supply at least one beneficial selection.

To achieve the above object, the application provides the following aspects.

Aspect 1, a chromatic dispersion monitor for estimating a chromatic dispersion in accordance with a chromatic dispersion correlation amount sequence, comprising: a phase differential unit, for obtaining a phase difference sequence by performing a phase differential calculation in accordance with the chromatic dispersion correlation amount sequence; a phase difference differential unit, for obtaining a phase difference differential sequence by performing a phase difference differential operation; and a chromatic dispersion estimating unit, for estimating the chromatic dispersion in accordance with the phase difference differential sequence obtained by the phase difference differential unit.

Aspect 2, the chromatic dispersion monitor according to aspect 1, wherein the phase differential unit is a first conjugate product calculating unit that obtains a first conjugate product sequence in accordance with the chromatic dispersion correlation amount sequence by performing a first conjugate multiplying operation, wherein the first conjugate multiplying operation is to calculate a product between one element in the chromatic dispersion correlation amount sequence and a complex conjugate of another element spaced by a predetermined distance therefrom in the chromatic dispersion correlation amount sequence; the phase difference differential unit is a second conjugate product calculating unit that obtains a second conjugate product sequence in accordance with the first conjugate product sequence by performing a second conjugate multiplying operation, wherein the second conjugate multiplying operation is to calculate a product between one element in the first conjugate product sequence and a complex conjugate of another element spaced by a predetermined distance therefrom in the first conjugate product sequence; and the chromatic dispersion estimating unit estimates the chromatic dispersion in accordance with the second conjugate product sequence.

Aspect 3, the chromatic dispersion monitor according to aspect 2, wherein further comprising a chromatic dispersion correlation amount sequence conversion step for converting respective elements in the chromatic dispersion correlation amount sequence to eliminate influences of amplitudes in the respective elements in the chromatic dispersion correlation amount sequence. This aspect can be completed with algorithms containing an argument taking function and an exponential function, e.g., with equation $\hat{h}_i = ce^{j \arg(h_i)}$, $h_i = \hat{h}_i$, wherein c is a fixed constant.

Aspect 4, the chromatic dispersion monitor according to aspect 2, wherein the first conjugate product calculating unit performs the conjugate multiplying operation with the following equation: $p_{min(i,i+j)} = h_i h^*_{i+j}$, wherein $p_i$ is the ith element in the conjugate product sequence, $h_i$ is the ith element in the chromatic dispersion correlation amount sequence, when j is an integer greater than 0 and less than N, i=1, 2, ..., N−j, when j is an integer less than 0 and greater than −N, i=1−j, 2=j, ..., N, N is the length of the chromatic dispersion correlation amount sequence, min(i,i+j) is to get the smaller value between i and i+j, and $h^*_{i+j}$ indicates the complex conjugate of $h_{i+j}$; the second conjugate product calculating unit performs second conjugate multiplying operation by using the following equation: $q_{min(i,i+m)} = p_i p^*_{i+m}$, wherein $q_i$ is the $i^{th}$ element in the second conjugate product sequence, when m is an integer greater than 0 and less than N−|j|, i=1, 2, ..., N−|j|−m, when m is an integer less than 0 and greater than −N+|j|, i=1−m, 2−m, ..., N−|j|, and $p^*_{i+m}$ indicates the complex conjugate of $p_{i+m}$; the chromatic dispersion estimating unit obtains a parameter a for chromatic dispersion estimation with one of the following two equations:

$$a = \frac{\text{mean}[\arg(q_1), \arg(q_2), \ldots, \arg(q_{N-|j|-|m|})]}{2mj\left(\frac{2\pi f_s}{N}\right)^2}$$

or $$a = \frac{\arg[\text{mean}(q_1, q_2, \ldots, q_{N-|j|-|m|})]}{2mj\left(\frac{2\pi f_s}{N}\right)^2}$$

wherein argil( ) indicates to get an argument of a complex number, mean( ) indicates to get an average, and $f_s$ is a system sampling rate Aspect 5, the chromatic dispersion monitor according to aspect 1, wherein the phase differential unit is an argument differential unit that calculates an argument for each chromatic dispersion correlation amount in the chromatic dispersion correlation amount sequence, and calculates an argument difference between the arguments to obtain an argument differential sequence; the phase difference differential unit is an argument difference differential unit that obtains an argument difference differential sequence in accordance with the argument differential sequence by performing a differential operation; and the chromatic dispersion estimating unit estimates the chromatic dispersion in accordance with the argument difference differential sequence.

Aspect 6, the chromatic dispersion monitor according to aspect 5, wherein the argument differential unit obtains the argument differential sequence with the following equation: $p_{min(i,i+j)} = \arg(h_i) - \arg(h_{i+j})$, where $p_i$ is the ith element in the argument differential sequence, $h_i$ is the ith element in the chromatic dispersion correlation amount sequence, when j is an integer greater than 0 and less than N, i=1, 2, ..., N−j, when j is an integer less than 0 and greater than −N, i=1−j, 2−j, ..., N, N is the length of the chromatic dispersion correlation amount sequence, and arg( ) indicates to get an argument of a complex number; the argument difference differential unit obtains the argument difference differential sequence with the following equation: $q_{min(i,i+m)} = pi - p_{i+m}$, where $q_i$ is the $i^{th}$ element in the argument difference differential sequence, when m is an integer greater than 0 and less than N−|j|, i=1, 2, ..., N−|j|−m, and when m is an integer less than 0 and greater than −N+|j|, i=1−m, 2−m, ..., N−|j|; the chromatic dispersion estimating unit obtains a parameter α for estimating the chromatic dispersion amount with the following equations: $\hat{q}_i = \text{mod}(q_i + \pi, 2\pi) - \pi$, and $$a = \frac{\text{mean}(\hat{q}_1, \hat{q}_2, \ldots, \hat{q}_{N-|j|-|m|})}{2mj\left(\frac{2\pi f_s}{N}\right)^2},$$

where $\text{mod}(q_i + \pi, 2\pi)$ indicates to get $\square q_i + \pi$ modulo $2\pi$ and mean( ) indicates to get an average.

Aspect 7, a chromatic dispersion compensator, wherein comprising the chromatic dispersion monitor according to any one of aspects 1 to 5.

Aspect 8, the chromatic dispersion compensator according to aspect 7, wherein further comprising: a static primary chromatic dispersion compensating unit, for compensating a chromatic dispersion in accordance with a chromatic dispersion estimation value obtained by the chromatic dispersion monitor; an adaptive residual chromatic dispersion compensating unit, for compensating a residual chromatic dispersion after the chromatic dispersion compensation by the primary chromatic dispersion compensating unit, and provides an input of a chromatic dispersion correlation amount calculating unit; and the chromatic dispersion correlation amount calculating unit, for calculating a chromatic dispersion correlation amount in accordance with a filter coefficient of the residual chromatic dispersion compensating unit; wherein the chromatic dispersion monitor monitors the chromatic dispersion in accordance with the chromatic dispersion correlation amount.

Aspect 9, a chromatic dispersion monitoring method for estimating a chromatic dispersion in accordance with a chromatic dispersion correlation amount sequence, comprising: a phase differential step, for obtaining a phase difference sequence by performing a phase differential calculation in accordance with the chromatic dispersion correlation amount sequence; a phase difference differential step, for obtaining a phase difference differential sequence by performing a phase difference differential operation; and a chromatic dispersion estimating step, for estimating the chromatic dispersion in accordance with the phase difference differential sequence obtained in the phase difference differential step.

Aspect 10, the chromatic dispersion monitoring method according to aspect 9, wherein the phase differential step obtains a first conjugate product sequence in accordance with the chromatic dispersion correlation amount sequence by performing a first conjugate multiplying operation, wherein the first conjugate multiplying operation is to calculate a product between one element in the chromatic dispersion correlation amount sequence and a complex conjugate of another element spaced by a predetermined distance therefrom in the chromatic dispersion correlation amount sequence; the phase difference differential step obtains a second conjugate product sequence in accordance with the first conjugate product sequence by performing a second conjugate multiplying operation, wherein the second conjugate multiplying operation is to calculate a product between one element in the first conjugate product sequence and a complex conjugate of another element spaced by a predetermined distance therefrom in the first conjugate product sequence; and the chromatic dispersion estimating step estimates the chromatic dispersion in accordance with the second conjugate product sequence.

Aspect 11, the chromatic dispersion monitoring method according to aspect 9, wherein the phase differential step calculates an argument for each chromatic dispersion correlation amount in the chromatic dispersion correlation amount sequence, and calculates an argument difference between the arguments to obtain an argument differential sequence; the phase difference differential step obtains an argument difference differential sequence in accordance with the argument differential sequence by performing a differential operation; and the chromatic dispersion estimating step estimates the chromatic dispersion in accordance with the argument difference differential sequence.

Aspect 12, a computer executable software, comprising such an instruction that when the instruction is executed by the computer or other logical device, the computer or other logical device is enabled to implement the steps in the above method. Herein the execution includes an execution after the instruction is explained or compiled.

Aspect 13, a computer readable storage medium stored with the computer executable software of aspect 12; the computer readable storage medium can be, e.g., CD, DVD, soft disk, magnetic tape, hard disk driver, flash memory, ROM, RAM, etc.

By means of the device and method of the present invention, the processes of unwrapping and quadratic fitting can be eliminated, so that the estimation of chromatic dispersion is more reliable.

In reference to the following descriptions and drawings, above and further aspects and features of the present invention will be clearer. The descriptions and drawings concretely disclose the specific embodiments of the present invention, and specify the principle of the invention and the ways that can be adopted. It shall be understood that the scope of the present invention is not limited thereby. Within the range of the spirit and provisions of the accompanied claims, the present invention includes various changes, modifications and equivalents.

Features described and/or illustrated with respect to one embodiment can be used in one or more other embodiments in the same or similar way, by combining features in other embodiments or replacing features in other embodiments.

To be emphasized, the term "include/comprise" in the text means the existence of feature, integral, step, or component, but not excluding the existence or addition of one or more other features, integrals, steps or components.

The aspects of the present invention can be understood better with reference to the drawings. The components in the drawings are not proportionally drafted, but for illustrating the principle of the present invention. For the convenience of illustrating and describing some portions of the present invention, corresponding components in the drawings may be amplified, i.e., they appear larger than other components in the examplary device actually fabricated according to the present invention. The elements and features described in one drawing or embodiment of the present invention can be combined with elements and features illustrated in one or more other drawings or embodiments. In addition, similar reference numerals represent corresponding components in the drawings, and can be used to indicate corresponding components in more than one embodiment.

BRIEF DESCRIPTION OF THE DRAWINGS

The drawings illustrate the preferred embodiments of the present invention, constitute a part of the Specification, and are used to further specifically describe the principle, feature and advantage of the present invention in combination with the Description.

DETAILED DESCRIPTION OF THE INVENTION

The embodiments of the present invention are described as follows in combination with the drawings. The present invention avoids the problem of phase unwrapping by means of phase differential, so that the estimation of chromatic dispersion is more reliable.

Figure 2:
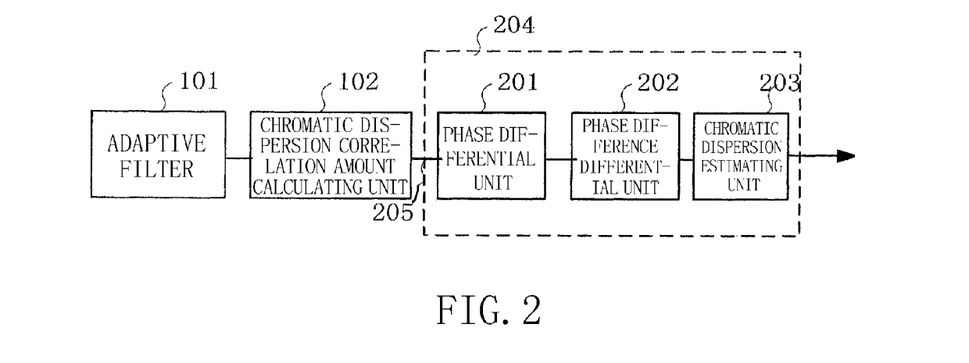
FIG. 2 illustrates a conceptual graph of a chromatic dispersion monitor according to the present invention.

FIG. 2 illustrates a chromatic dispersion monitor according to an embodiment of the present invention. As shown in FIG. 2, the chromatic dispersion monitor according to an embodiment of the present invention comprises an adaptive filter 101, a chromatic dispersion correlation amount calculating unit 102 and a chromatic dispersion monitor 204.

The adaptive filter 101 and the chromatic dispersion correlation amount calculating unit 102 are same as those in the prior art, and herein are not described. In the embodiment of the present invention, the chromatic dispersion monitor 204 comprises a phase differential unit 201, a phase difference differential unit 202 and a chromatic dispersion estimating unit 203.

It is assumed that an AD sampling rate of a system, (e.g., receiver system) is $f_s$, the chromatic dispersion correlation amount calculating unit 102 extracts a chromatic dispersion correlation amount $H(\omega)$, which is a set of discrete sequences represented as $h_1, h_2, \ldots, h_N$ with the length equal to the filter coefficient length N.

The chromatic dispersion monitor 204 which is composed of the phase differential unit 201, the phase difference differential unit 202 and the chromatic dispersion estimating unit 203, allows two operation ways, i.e., processing conjugate product of the sequence $h_1, h_2, \ldots, h_N$, or processing differential of argument sequence $\arg(h_1), \arg(h_2), \ldots, \arg(h_N)$, wherein $\arg(*)$ indicates to obtain an argument of a complex number, and the detailed descriptions are given as follows.

Figure 3:
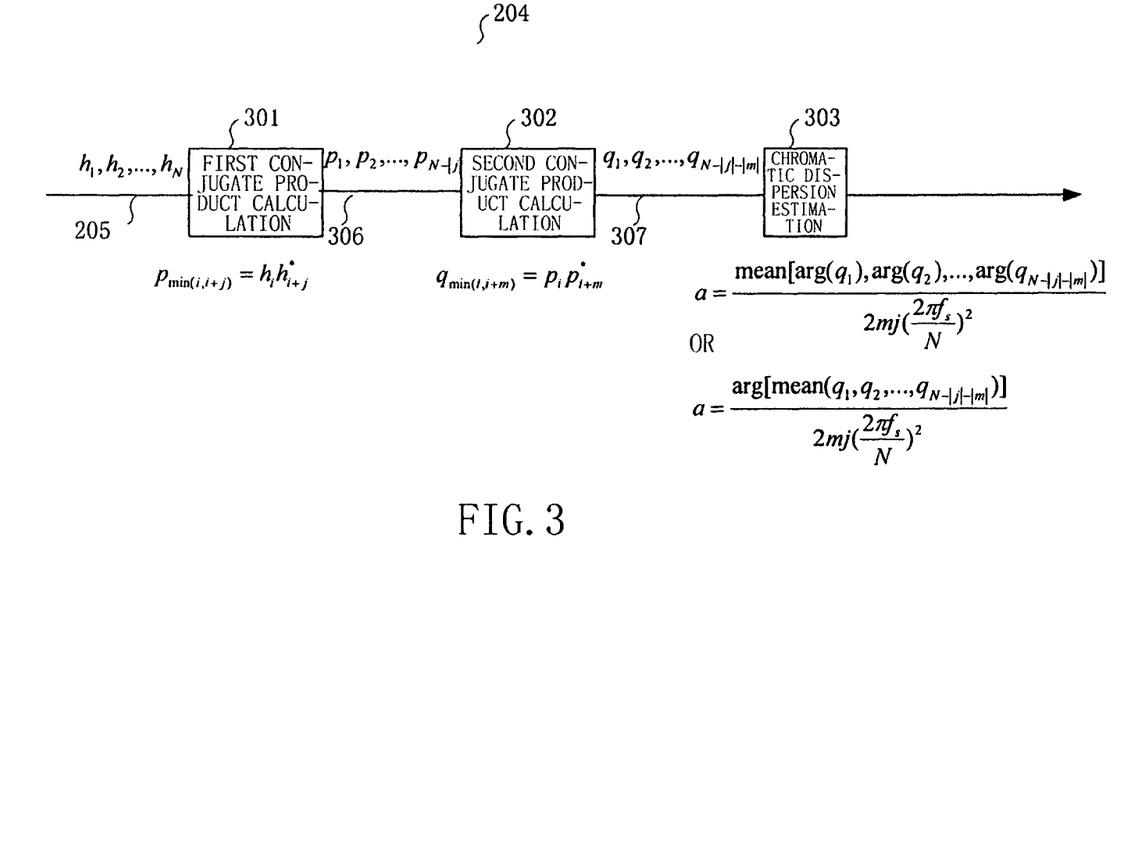
FIG. 3 illustrates an explanatory block diagram of a chromatic dispersion monitor according to an embodiment of the present invention.

FIG. 3 illustrates an embodiment in which the chromatic dispersion monitor 204 processes conjugate product of the sequence $h_1, h_2, \ldots, h_N$, wherein a first conjugate product calculating unit 301, a second conjugate product calculating unit 302 and a chromatic dispersion estimating unit 303 correspond to the phase differential unit 201, the phase difference differential unit 202 and the chromatic dispersion estimating unit 203 in FIG. 2, respectively.

As shown in FIG. 3, the chromatic dispersion correlation amount $H(\omega)$ outputted by the chromatic dispersion correlation amount calculating unit 102 is a sequence 205 represented as $h_1, h_2, \ldots, h_N$, and the sequence 205 is inputted to the first conjugate product calculating unit 301.

Through conjugate multiplying operation, the first conjugate product calculating unit 301 obtains a conjugate product sequences of the inputted sequence 205, i.e., a first conjugate product sequence 306 corresponding to the phase differential sequence. The first conjugate product sequence 306 can be represented as wherein $p_1, p_2, \ldots, p_{N-|j|}$, wherein $p_{min(i,i+j)} = h_i h^*_{i+j}$, $p_i$ is the $i^{th}$ element in the first conjugate product sequence 306, and $\min(i,i+j)$ is the smaller value between $i$ and $i+j$. In one embodiment, $N > j > 0$, and at that time, $i=1, 2, \ldots, N-j$. In another embodiment, $-N < j < 0$, and at that time, $i=1-j, 2-j, \ldots, N$. From the above descriptions, it can be seen that the conjugate multiplying operation is a multiplication of a certain chromatic dispersion correlation amount in a chromatic dispersion correlation amount sequence with a conjugation of another chromatic dispersion correlation amounts spaced therefrom by one or more other chromatic dispersion correlation amounts in that sequence.

Through conjugate multiplying operation, the second conjugate product calculating unit 302 obtains a further conjugate product sequence of the first conjugate product sequence 306, which is called as a second conjugate product sequence 307 and represented by $q_1, q_2, \ldots, q_{N-|j|-|m|}$ in the drawing, wherein $q_{min(i,i+m)}=p_i p^*_{i+m}$, $q_i$ is the ith element in the second conjugate product sequence 307, in one embodiment, $^{N-|j|} > m > 0$, at that time, $i = 1, 2, \ldots, N-|j|-m$. In another embodiment, $^{-N+|j|} < m < 0$, at that time, $i = 1-m, 2-m, \ldots, N-|j|$.

In the present invention, the sequence 205 corresponds to the chromatic dispersion correlation amount sequence, the first conjugate product sequence 306 corresponds to the phase differential sequence, and the second conjugate product sequence 307 corresponds to the phase difference differential sequence. The operation using the equation $p_{min(i,i+j)}=h_i h^*_{i+j}$ corresponds to the phase differential operation, and the operation using the equation $q_{min(i,i+m)}=p_i p^*_{i+m}$ corresponds to the phase difference differential operation.

The chromatic dispersion estimating unit 303 estimates α by calculating an average and taking phase angle. For example, the chromatic dispersion estimating unit 303 can estimate a by firstly taking the phase angle and then calculating the average. At that time, $$a = \frac{\text{mean}[\arg(q_1), \arg(q_2), \ldots, \arg(q_{N-|j|-|m|})]}{2mj\left(\frac{2\pi f_s}{N}\right)^2},$$

i.e., firstly taking the argument for $q_i$, then calculating the average, finally dividing with a normalization constant. Alternatively, the chromatic dispersion estimating unit 303 can estimate α by firstly calculating the average and then taking the argument. At that time, $$a = \frac{\arg[\text{mean}(q_1, q_2, \ldots, q_{N-|j|-|m|})]}{2mj\left(\frac{2\pi f_s}{N}\right)^2},$$

i.e., firstly calculating the average for $q_i$, then taking the argument, finally dividing with a normalization constant. Wherein arg(*) indicates to get an argument of a complex number, mean(*) indicates to get an average, and the chromatic dispersion amount can be estimated directly based on a with the prior art.

The above method is with respect to the complex number operation, but it is only related to the phase angle, and is unrelated to the module value A. Actually, it can take $\hat{h}_i = ce^{jarg(h_i)}$, c is any constant. Preferably, c=1, at that time, $\hat{h}_i = e^{jarg(h_i)}$, and the subsequent first conjugation calculation is performed by replacing $h_i$ with $\hat{h}_i$.

The sequence $h_1, h_2, \ldots, h_N$ has form of $Ae^{j(a\omega_1^2+b\omega_1+c)}$, $Ae^{j(a\omega_2^2+b\omega_2+c)}, \ldots, Ae^{j(a\omega_N^2+b\omega_N+c)}$. But in actual work, the module values A of the respective elements in the sequence $h_1, h_2, \ldots, h_N$ may be not completely equal to each other, i.e., there are slight differences. With the above equation $\hat{h}_i = ce^{jarg(h_i)} = ce^{j(a\omega_i^2+b\omega_i+c)}$, the influence of A is eliminated, so that the estimation of the chromatic dispersion is more reliable. The influence of A also can be eliminated with other equations.

The principle of the method is described herein by taking an example that j=1 and m=1.

The sequence $h_1, h_2, \ldots, h_N$ has form of $Ae^{j(a\omega_1^2+b\omega_1+c)}$, $Ae^{j(a\omega_2^2+b\omega_2+c)}, \ldots, Ae^{j(a\omega_N^2+b\omega_N+c)}$, wherein $$\omega_2 - \omega_1 = \omega_3 - \omega_2 = \ldots = \omega_N - \omega_{N-1} = \Delta\omega = \frac{2\pi f_s}{N},$$

then the sequence $p_1, p_2, \ldots, p_{N-1}$ has form of $|A|^2 e^{-j(a(\omega_1\omega_2)\Delta\omega + b\Delta\omega)}$, $|A|^2 e^{-j(a(\omega_2\omega_3)\Delta\omega + b\Delta\omega)}, \ldots, |A|^2 e^{-j(a(\omega_{N-1}\omega_N)\Delta\omega + b\Delta\omega)}$, wherein c is eliminated; sequence $q_1, q_2, \ldots, q_{N-2}$ has form of $|A|^4 e^{ja(2\Delta\omega^2)}$, $|A|^4 e^{ja(2\Delta\omega^2)}, \ldots, |A|^4 e^{ja(2\Delta\omega^2)}$, wherein b is eliminated and the sequence is constant, without the necessary of being unwrapped. During the estimation of α, the average is calculated to eliminate the influence of the noise, so as to obtain more accurate estimation.

Figure 4:
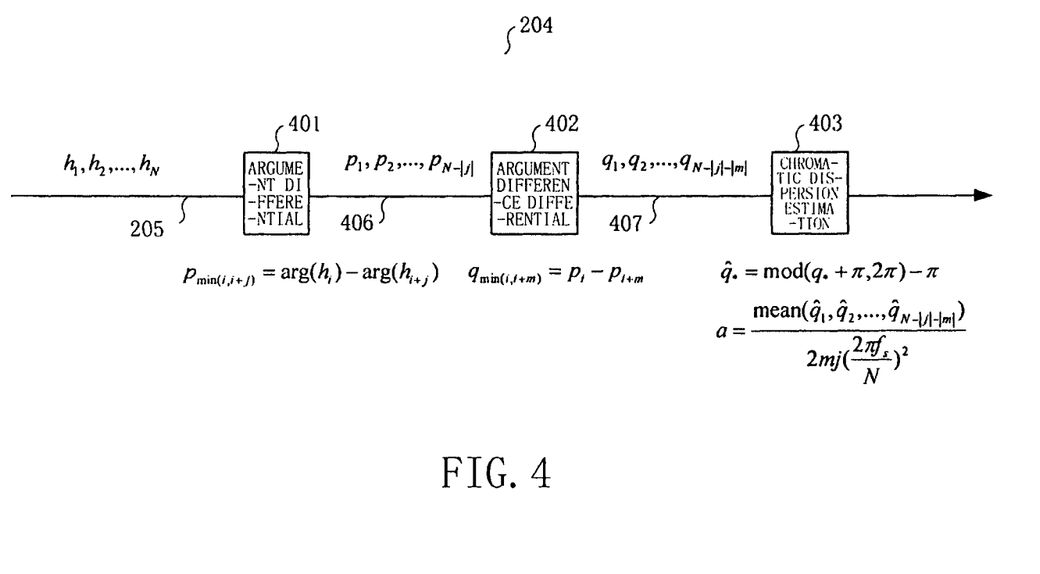
FIG. 4 illustrates an explanatory block diagram of a chromatic dispersion monitor according to another embodiment of the present invention.

FIG. 4 illustrates an embodiment in which the chromatic dispersion monitor 204 processes the argument sequence $\arg(h_1), \arg(h_2), \ldots, \arg(h_N)$. Wherein an argument differential unit 401, an argument difference differential unit 402 and a chromatic dispersion estimating unit 403 correspond to the phase differential unit 201, the phase difference differential unit 202 and the chromatic dispersion estimating unit 203 in FIG. 2, respectively.

As shown in FIG. 4, the chromatic dispersion correlation amount $H(\omega)$ outputted by the chromatic dispersion correlation amount calculating unit 102 is a sequence 205 ($h_1, h_2, \ldots, h_N$), and the sequence 205 is inputted to the argument differential unit 401.

Through the difference operation, the argument differential unit 401 obtains a sequence 406 called as the argument differential sequence 406 and represented as $p_1, p_2, \ldots, p_{N-|j|}$, wherein $p_{min(i,i+j)}=\arg(h_i)-\arg(h_{i+j})$. In an embodiment, $N > j > 0$, at that time, $i = 1, 2, \ldots, N-j$. In another embodiment, $-N < j < 0$, at that time, $i = 1-j, 2-j, \ldots, N$. $p_i$ is the $i^{th}$ element in the argument differential sequence 406, i.e., to get a difference between an argument of an element in the sequence 205 and an argument of an element spaced therefrom by a specified distance.

Through the difference operation, the argument difference differential unit 402 obtains an argument difference differential sequence 407 represented by $q_1, q_2, \ldots, q_{N-|j|-|m|}$, wherein $q_{min(i,i+m)}=p_i - p_{i+m}$, $q_i$ is the $i^{th}$ element in the argument difference differential sequence 407. In one embodiment, $^{N-|j|} > m > 0$, at that time, $i = 1, 2, \ldots, N-|j|-m$. In another embodiment, $^{-N+|j|} < m < 0$, at that time, $i = 1-m, 2-m, \ldots, N-|j|$.

The chromatic dispersion estimating unit 403 adds it to respective element in the sequence $q_1, q_2, \ldots, q_{N-|j|-|m|}$, calculates modulus of them with respect to $2\pi$ (also called as modulo $2\pi$), so that each of the elements is limited in $(-\pi, \pi]$, so as to obtain a sequence $\hat{q}_1, \hat{q}_2, \ldots, \hat{q}_{N-|j|-|m|}$, i.e. $\hat{q}_i = \text{mod}(q_i+\pi, 2\pi)-\pi$, $q_i$ is the $i^{th}$ element in the argument difference differential sequence 407. Wherein $\text{mod}(q_i+\pi, 2\pi)$ indicates $q_i+\pi$ modulo $2\pi$. Then the average is calculated to estimate $$a = \frac{\text{mean}(\hat{q}_1, \hat{q}_2, \ldots, \hat{q}_{N-|j|-|m|})}{2mj\left(\frac{2\pi f_s}{N}\right)^2},$$

wherein mean( ) indicates to get average, and the chromatic dispersion amount can be estimated directly based on α with the prior art.

In addition, similarly, the influence of A can also be eliminated with certain algorithms as mentioned previously.

The principle of the method is described herein by taking an example that j=1 and m=1.

The sequence $h_1, h_2, \ldots, h_N$ has form of $Ae^{j(a\omega_1^2+b\omega_1+c)}$, $Ae^{j(a\omega_2^2+b\omega_2+c)}, \ldots, Ae^{j(a\omega_N^2+b\omega_N+c)}$, wherein $$\omega_2 - \omega_1 = \omega_3 - \omega_2 = \ldots = \omega_N - \omega_{N-1} = \Delta\omega = \frac{2\pi f_s}{N},$$

then the sequence $p_1, p_2, \ldots, p_{N-1}$ has form of $-j(a(\omega_1+\omega_2)\Delta\omega+b\Delta\omega), -j(a(\omega_2+\omega_3)\Delta\omega+b\Delta\omega), \ldots, -j(a(\omega_{N-1}+\omega_N)\Delta\omega+b\Delta\omega)$, c is eliminated; the sequence $q_1, q_2, \ldots, q_{N-2}$ has form of $ja(2\Delta\omega^2), ja(2\Delta\omega^2), \ldots, ja(2\Delta\omega^2)$, wherein b is eliminated and the sequence is constant, without the necessary of being unwrapped. During the estimation of α, the average is calculated to eliminate the influence of the noise, so as to obtain more accurate estimation.

The chromatic dispersion monitor of the present invention may have many applications, e.g., being applied in the chromatic dispersion compensating device, the system state detecting device, etc.

OFC/NFOEC2007 OTuA1 "Transmission of 42.8 Gbit/s Polarization Multiplexed NRZ-QPSK over 6400 km of Standard Fiber with no Optical Dispersion Compensation" mentions a structure that uses two-stage filter to compensate the loss of an optical fiber transmission system. In this system, usually a FIR of preset coefficient is used to compensate the dispersion, but the concrete preset value is unknown. The preset value can be estimated with the chromatic dispersion monitor of the present invention by utilizing the following FIR.

Figure 5:
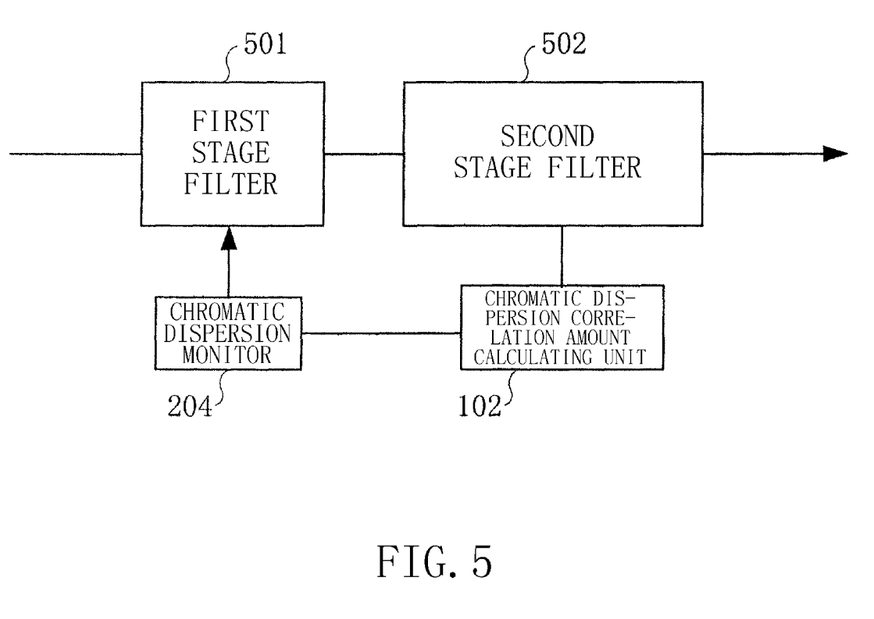
FIG. 5 illustrates an explanatory block diagram of a chromatic dispersion compensator of a chromatic dispersion monitor according to the present invention.

FIG. 5 illustrates a chromatic dispersion compensator according to an embodiment of the present invention. As shown in FIG. 5, the chromatic dispersion compensator according to an embodiment of the present invention comprises a first stage filter 501, a second stage filter 502, a chromatic dispersion correlation amount calculating unit 102 and a chromatic dispersion monitor 204.

The first stage filter 501 filters with a long-coefficient filter of a static coefficient, so as to compensate a relatively large chromatic dispersion. The second stage filter 502 filters with an adaptive short-coefficient filter, so as to track the system change in real-time, compensate residual dispersion and polarize relevant dispersion. The second stage filter 502 further completes demultiplexing in a polarization multiplexing system. The second stage filter 502 corresponds to the adaptive filter 101 in FIGS. 1 and 2. When the system change is large, the residual dispersion will approach to or exceed the compensation limit of the second stage filter 502, and then the filter coefficient of the first stage filter 501 shall be adjusted, so that the residual dispersion is within the compensation range of the second stage filter 502. The determination of the coefficient of the first stage filter 501 requires a dispersion value in the system, and the dispersion value can be determined based on the filter coefficient of the second stage filter 502. Namely, in an embodiment of the present invention, the second stage filter 502 outputs its filter coefficient to the chromatic dispersion correlation amount calculating unit 102.

The chromatic dispersion monitor of the present invention monitors the filter coefficient of the short-coefficient filter, then determines the dispersion value in the system and adjusts the dispersion compensation amount of the long-coefficient filter, so that even if the system dispersion changes, the long-coefficient filter is still capable of compensating most dispersion, and the residual dispersion of the system is still within the compensation range of the short-coefficient filter.

In addition, although the above descriptions are just with respect to a chromatic dispersion compensator that performs filtering compensation with two stages, a person skilled in the art can conceive that the chromatic dispersion monitor of the present invention can also be used for a chromatic dispersion compensator that performs the filtering compensation with only one stage. At that time, the monitored dispersion value is directly estimated, and the estimated dispersion value is sent to other modules upon request.

Figure 6:
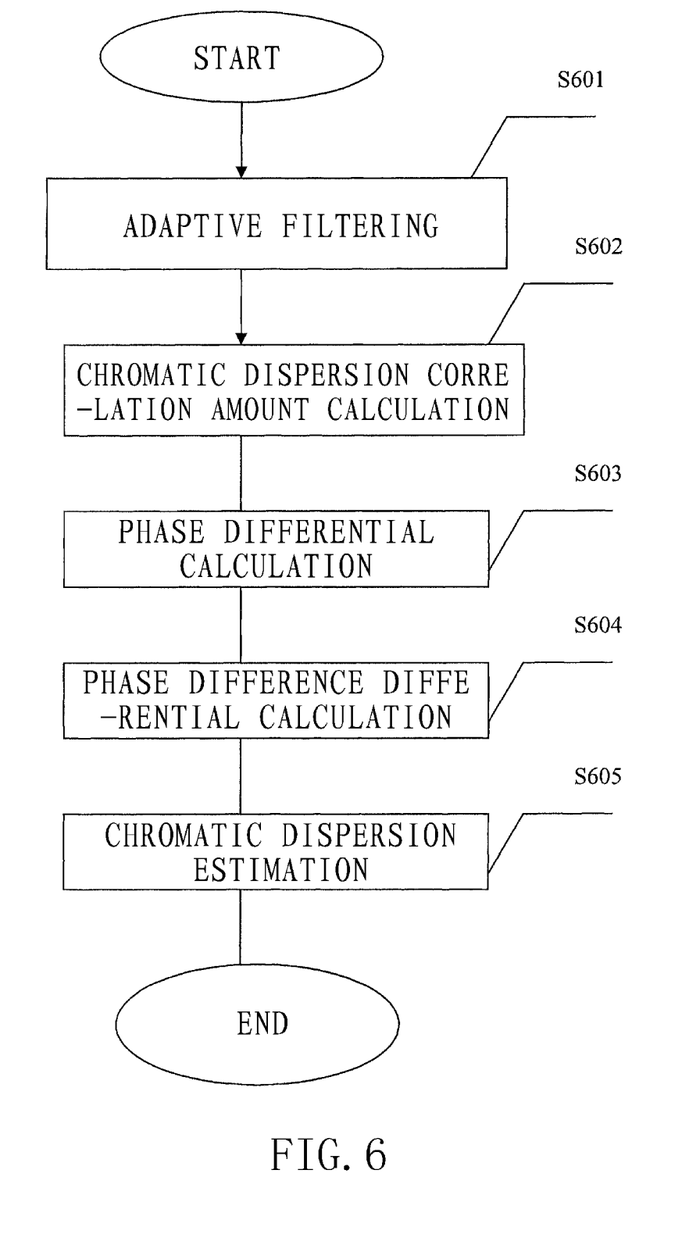
FIG. 6 illustrates a flow diagram of a chromatic dispersion monitoring method according to an embodiment of the present invention.

FIG. 6 illustrates a flow diagram of a chromatic dispersion monitoring method according to an embodiment of the present invention.

As shown in FIG. 6, firstly in step S601, the adaptive filter 101 performs an adaptive filtration. Next, in step S602, the chromatic dispersion correlation amount calculating unit calculates the chromatic dispersion correlation amount and obtains a chromatic dispersion correlation amount sequence $h_1, h_2, \ldots, h_N$. After that, in step S603, a phase differential calculation is performed. In this step, as shown in FIG. 3, a first conjugate calculation can be carried out by the first conjugate product calculating unit in accordance with the algorithm described previously, so as to obtain a first conjugate product sequence $p_1, p_2, \ldots, p_{N-|j|}$ ($p_{min(i,i+j)}=h_ih^*_{i+j}$) in accordance with the chromatic dispersion correlation amount sequence $h_1, h_2, \ldots, h_N$. Optionally, in this step, a differential calculation can be performed by the argument differential unit 401, as shown in FIG. 4, so as to obtain an argument differential sequence $p_1, p_2, \ldots, p_{N-|j|}$ in accordance with the chromatic dispersion correlation amount sequence $h_1, h_2, \ldots, h_N$, wherein $p_{min(i,i+j)}=\arg(h_i)-\arg(h_{i+j})$. Next, a phase difference differential calculation is carried out in step S604. When the first conjugate product sequence is calculated in step 603, a second conjugate product sequence will be calculated in step S604, and this is carried out, e.g., by the second conjugate product calculating unit 302 in FIG. 3 with the previous algorithm. When the argument difference sequence is calculated in step 603, an argument difference differential sequence will be calculated in step S604, and this is carried out, e.g., by the argument difference differential unit 402 in FIG. 4.

After that, in step S605, an estimation of chromatic dispersion is carried out. The estimation of chromatic dispersion can be carried out by the chromatic dispersion estimating unit 303 in FIG. 3, or by the chromatic dispersion estimating unit 403 in FIG. 4, in accordance with the calculation result of step S604.

To be noted, the descriptions of the present invention are just exemplary, so that a person skilled in the art can clearly know and then implement the present invention. For this reason, some components, which may exist in actual conditions but are obvious for a person skilled in the art, are omitted in the descriptions of the invention.

The specific embodiments of the present invention are described as above. But a person skilled in the art will understand that any change, modification or replacement to the present invention is possible. Thus any change, modification or replacement not deviating from the spirit and scope of the claims of the present invention shall be explained as falling within the protection scope of the present invention.

What is claimed is:

1. A chromatic dispersion monitor for estimating a chromatic dispersion in accordance with a chromatic dispersion correlation amount sequence, comprising:
   an adaptive filter controlled by filter coefficients;
   a chromatic dispersion correlation amount calculating unit connected to an output of the adaptive filter and producing the chromatic dispersion correlation amount sequence, wherein the chromatic dispersion correlation amount sequence is obtained based on the filter coefficients of the adaptive filter;

a phase differential unit, connected to an output of the chromatic dispersion correlation amount calculating unit and for obtaining a phase difference sequence by performing a phase differential calculation in accordance with the chromatic dispersion correlation amount sequence, the chromatic dispersion correlation amount sequence being an expression in frequency domain for channel transfer function of a monitored channel;

a phase difference differential unit, connected to an output of the phase differential unit and for obtaining a phase difference differential sequence by performing a phase difference differential operation; and a chromatic dispersion estimating unit, connected to an output of the phase difference differential unit and for estimating the chromatic dispersion in accordance with the phase difference differential sequence obtained by the phase difference differential unit.

2. The chromatic dispersion monitor according to claim 1, wherein the phase differential unit is a first conjugate product calculating unit that obtains a first conjugate product sequence in accordance with the chromatic dispersion correlation amount sequence by performing a first conjugate multiplying operation, wherein the first conjugate multiplying operation is to calculate a product between one element in the chromatic dispersion correlation amount sequence and a complex conjugate of another element spaced by a predetermined distance therefrom in the chromatic dispersion correlation amount sequence;

the phase difference differential unit is a second conjugate product calculating unit that obtains a second conjugate product sequence in accordance with the first conjugate product sequence by performing a second conjugate multiplying operation, wherein the second conjugate multiplying operation is to calculate a product between one element in the first conjugate product sequence and a complex conjugate of another element spaced by a predetermined distance therefrom in the first conjugate product sequence; and the chromatic dispersion estimating unit estimates the chromatic dispersion in accordance with the second conjugate product sequence.

3. The chromatic dispersion monitor according to claim 2, wherein the first conjugate product calculating unit performs the first conjugate multiplying operation with the following equation:

$$p_{min(i,i+j)} = h_i h^*_{i+j},$$

wherein $p_i$ is the $i^{th}$ element in the first conjugate product sequence, $h_i$ is the ith element in the chromatic dispersion correlation amount sequence, when j is an integer greater than 0 and less than N, i=1, 2, ..., N−j, when j is an integer less than 0 and greater than −N, i=1−j, 2−j, ..., N, N is the length of the chromatic dispersion correlation amount sequence, min(i,i+j) is to get the smaller value between i and i+j, and $h^*_{i+j}$ indicates the complex conjugate of $h_{i+j}$;

the second conjugate product calculating unit performs the conjugate multiplying operation with the following equation:

$$q_{min(i,i+m)} = p_i p^*_{i+m},$$

wherein $q_i$ is the $i^{th}$ element in the second conjugate product sequence, when m is an integer greater than 0 and less than N−|j|, i=1, 2, ..., N−|j|−m, when m is an integer less than 0 and greater than −N+|j|, i=1−m, 2−m, ..., N−|j|, and $p^*_{i+m}$ indicates the complex conjugate of $p_{i+m}$;

the chromatic dispersion estimating unit obtains a parameter α for chromatic dispersion estimation with one of the following two equations:

$$\alpha = \frac{\text{mean}[\arg(q_1), \arg(q_2), \ldots, \arg(q_{N-|j|-|m|})]}{2mj\left(\frac{2\pi f_s}{N}\right)^2}$$

or $$\alpha = \frac{\arg[\text{mean}(q_1, q_2, \ldots, q_{N-|j|-|m|})]}{2mj\left(\frac{2\pi f_s}{N}\right)^2}$$

wherein arg( ) indicates to get an argument of a complex number, mean( ) indicates an average, and $f_s$ is an AD sampling rate used by the receiver.

4. A chromatic dispersion compensator, wherein comprising the chromatic dispersion monitor according to claim 1.

5. The chromatic dispersion compensator according to claim 4, wherein further comprising:

a static primary chromatic dispersion compensating unit, for compensating a chromatic dispersion in accordance with a chromatic dispersion estimation value obtained by the chromatic dispersion monitor;

wherein, the adaptive filter is used for compensating a residual chromatic dispersion after the chromatic dispersion compensation by the primary chromatic dispersion compensating unit; and the chromatic dispersion correlation amount calculating unit is used for calculating a chromatic dispersion correlation amount in accordance with the filter coefficients of the adaptive filter;

wherein the chromatic dispersion monitor monitors the chromatic dispersion in accordance with the chromatic dispersion correlation amount.

6. A chromatic dispersion monitoring method for estimating a chromatic dispersion in accordance with a chromatic dispersion correlation amount sequence, comprising:

adaptively filtering a signal using filter coefficients;

obtaining the chromatic dispersion correlation amount sequence by performing a chromatic dispersion correlation amount calculation, wherein the chromatic dispersion correlation amount sequence is obtained based on the filter coefficients of an adaptive filter;

obtaining a phase difference sequence by performing a phase differential calculation in accordance with the chromatic dispersion correlation amount sequence, the chromatic dispersion correlation amount sequence being an expression in frequency domain for the channel transfer function of a monitored channel;

obtaining a phase difference differential sequence by performing a phase difference differential operation; and estimating the chromatic dispersion in accordance with the phase difference differential sequence obtained in the phase difference differential step.

7. The chromatic dispersion monitoring method according to claim 6, wherein:

obtaining the phase difference sequence obtains a first conjugate product sequence in accordance with the chromatic dispersion correlation amount sequence by performing a first conjugate multiplying operation, wherein the first conjugate multiplying operation is to calculate a product between one element in chromatic dispersion correlation amount sequence and a complex conjugate of another element spaced by a predetermined distance therefrom in obtaining the phase difference differential sequence obtains a second conjugate product sequence in accordance with the first conjugate product sequence by performing a second conjugate multiplying operation, wherein the second conjugate multiplying operation is to calculate a product between one element in the first conjugate product sequence and a complex conjugate of another element spaced by a predetermined distance therefrom in the first conjugate product sequence; and the estimating estimates the chromatic dispersion in accordance with the second conjugate product sequence.

8. A chromatic dispersion compensator, wherein comprising the chromatic dispersion monitor according to claim 2.

9. A chromatic dispersion compensator, wherein comprising the chromatic dispersion monitor according to claim 3.

* * * * *

UNITED STATES PATENT AND TRADEMARK OFFICE
CERTIFICATE OF CORRECTION

PATENT NO. : 8,798,477 B2  
APPLICATION NO. : 12/623009  
DATED : August 5, 2014  
INVENTOR(S) : Ling Liu et al.

Page 1 of 1

It is certified that error appears in the above-identified patent and that said Letters Patent is hereby corrected as shown below:

In the Claims

Column 11, Line 60 (Approx.), In Claim 3, delete "conjugate" and insert -- second conjugate --, therefor.

Column 12, Line 18 (Approx.), In Claim 3, delete "to get an" and insert -- an --, therefor.

Column 13, Line 2, In Claim 7, delete "in" and insert -- in the --, therefor.

Column 13, Line 5, In Claim 7, delete "in" and insert -- in the chromatic dispersion correlation amount sequence; --, therefor.

Signed and Sealed this  
Twenty-third Day of December, 2014

Michelle K. Lee  
*Deputy Director of the United States Patent and Trademark Office*